United States Patent [19]

King

[11] B 3,917,184

[45] Nov. 4, 1975

[54] METHOD AND APPARATUS FOR LOADING CASSETTES WITH MAGNETIC TAPE

[75] Inventor: James L. King, Sudbury, Mass.

[73] Assignee: King Instrument Corporation, Westboro, Mass.

[22] Filed: Sept. 15, 1972

[21] Appl. No.: 289,471

[44] Published under the Trial Voluntary Protest Program on January 28, 1975 as document no. B 289,471.

[52] U.S. Cl. ............... 242/56.8; 156/159; 156/507; 242/58.1

[51] Int. Cl.$^2$ ........................................ B65H 35/02

[58] Field of Search....... 242/56.8, 56 R, 58.1, 58.4; 156/157, 159, 502, 506, 507

[56] References Cited

UNITED STATES PATENTS

| | | | |
|---|---|---|---|
| 3,634,172 | 1/1972 | Fujii | 156/506 |
| 3,693,900 | 9/1972 | Bohn | 242/56 R |
| 3,722,810 | 3/1973 | Kendall | 242/56 R |

*Primary Examiner*—Henry K. Artis
*Assistant Examiner*—Edward J. McCarthy
*Attorney, Agent, or Firm*—Schiller & Pandiscio

[57] ABSTRACT

The invention comprises a method and apparatus for loading cassettes with magnetic tape with registration holes being punched in the tape during the winding and splicing operation.

4 Claims, 8 Drawing Figures

METHOD AND APPARATUS FOR LOADING CASSETTES WITH MAGNETIC TAPE

This invention relates to magnetic tape cassettes and more particularly to a method and apparatus for tailoring magnetic tapes.

Magnetic tape cassettes customarily consist of a case containing two rotatable spools or hubs, a leader attached to each spool or hub, and a predetermined length of blank or prerecorded magnetic tape having its ends spliced to the two leaders. In the manufacture of such cassettes, one common practice is to start with an empty cassette consisting of a cassette case with two hubs and a length of leader tape having one end connected to one hub and the other end connected to the other hub. The first step in filling the cassette with magnetic tape is to cut the leader tape to form two discrete leaders. Then magnetic tape is spliced to one leader and the hub to which the one leader is connected is rotated to wind up a given length of the magnetic tape. Thereafter the magnetic tape is cut and its trailing end is spliced to the leader on the other hub. An alternative procedure is to start with only the two hubs each having a short leader, splice magnetic tape to the leader on one hub, wind a given amount of tape on said one hub, splice the trailing end of the magnetic tape to the leader on the other hub, and thereafter mount the two hubs in a cassete case. Machines for carrying out the foregoing methods are well known in the art, and one such machine is shown and described in my U.S. Pat. No. 3,637,153, issued Jan. 25, 1972 for Machine for Splicing and Winding Tape into A Cassette It has been recognized as desirable to provide means for automatically stopping transport of magnetic tape in a cassette being used before the leader at the trailing end of the tape has been fully unwound, thereby to prevent detaching the leader from its hub. Accordingly, means are required to enable detecting when a tape has been almost fully unwound from a hub. Recently the magnetic tape cassette industry agreed upon a standardized method for detecting the end of the tape in a magnetic tape cassette. This standardized method consists of punching a registration hole of predetermined size centrally on the tape at a point approximately 18 inches from the trailing end of the tape. For reversible double track cassettes, i.e. cassettes that can be reversed in the cassette player to utilize one or the other of two separate recording tracks on the same tape, a hole is punched at each end of the magnetic tape. Light sensitive means associated with the magnetic tape player equipment detects the occurrence of one of such holes and automatically terminates operation of the tape transport mechanism when a hole is detected.

Accordingly, the primary object of this invention is to provide means for tailoring a magentic tape in a cassette so as to provide a registration hole at either or both ends of a magnetic tape, the hole being located and dimensioned in accordance with the established requirements of the magnetic tape cassette industry.

A more specific object of the invention is to provide a method and means for forming registration holes in a magnetic tape as the magnetic tape is being spliced and wound into a cassette.

A further object of this invention is to provide a means for punching registration holes in a magnetic tape as the latter is being wound into a cassette, with the registration holes being automatically located a predetermined distance from the beginning and end of the magnetic tape.

The foregoing and other objects are achieved by a novel method and apparatus as herein described. Essentially the method consists of splicing one end of a magnetic tape to a first tape leader attached to a first hub and providing a hole in the magnetic tape a predetermined distance from its connection to the tape leader, winding the leader and a selected amount of the magnetic tape on the hub, punching a second hole in the tape at a point some distance from the hub, then continuing to wind the tape so as to advance the second punched hole a selected distance closer to the cassette, terminating winding, punching a third hole in the tape a predetermined distance from the second hole, severing the tape intermediate the second and third punched holes so as to form a trailing end and a leading end, splicing the trailing end to a second leader on a second hub, and thereafter splicing the leading end to a third leader attached to a third hub, winding the third leader with its attached tape on the third hub, terminating winding after a selected amount of tape has been wound, and repeating the foregoing steps commencing with the operation of punching the second hole. The hubs may be installed in a cassette before or after the magnetic tape has been tailored and leadered. The foregoing method may be carried out manually or automatically by apparatus comprising a punching mechanism in association with a cassette tape winding and splicing machine of the general type described in the abovementioned application or another similar machine as hereindescribed.

Other features and many of the attendant advantages of the invention are set forth in or rendered obvious by the following detailed specification which is to be considered together with the accompanying drawings, wherein.

Figure 1:
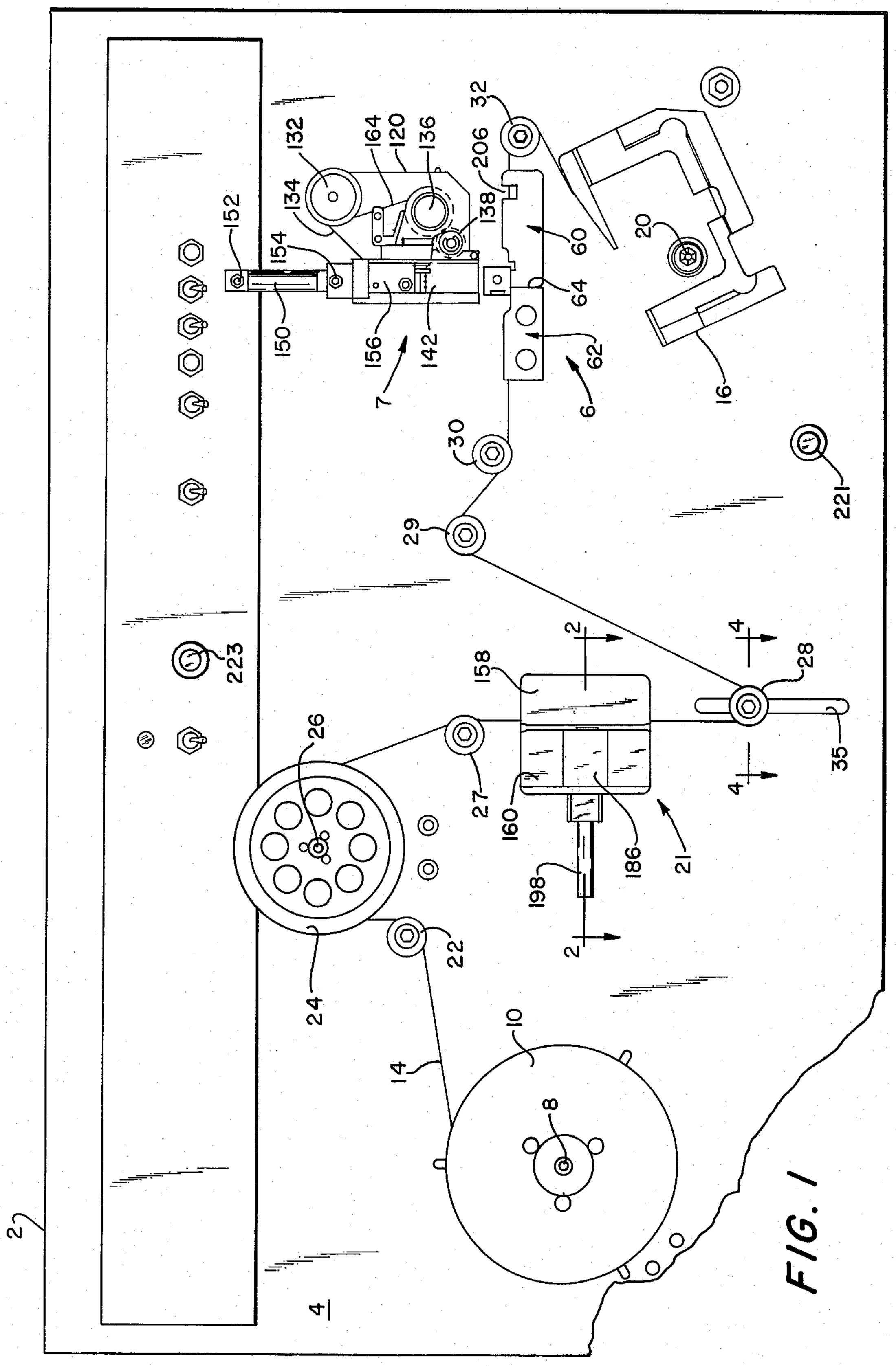
FIG. 1 is a front elevation of a magnetic tape cassette winding and splicing machine embodying the present invention.

Turning now to FIG. 1, the illustrated machine is essentially the same as the one disclosed in my copending application Ser. No. 147,376, filed May 27, 1971, for Apparatus for Splicing Tape, except that it has been modified to punch tape in accordance with this invention. Accordingly, only so much of the basic machine is disclosed as is necessary to fully and accurately describe the present invention and reference may be had to the aforementioned application Ser. No. 147,376 for any specific details of interest that are not included or are only schematically illustrated in FIGS. 1–8 hereof.

The illustrated machine comprises a console 2 having a front panel 4 which supports a splicing head assembly 6, a splicing tape dispensing mechanism 7, a rotatable shaft 8 which is adapted to support a supply reel 10 of magnetic tape 14, a cassette holder 16 adapted to hold a cassette 18 and a rotatable winding spindle 20 that is adapted to mate with and drive one of the hubs of a cassette mounted in holder 16. Also affixed to front panel 4 is a tape punching mechanism 21.

Tape 14 is paid out from reel 10 over a guide roller 22 and around a large footage counting wheeley 24 which is mounted on a shaft 26 rotatably supported in the panel 4. From wheel 24 the tape passes around a second guide roller 27, through the punching mechanism 21, and around three additional guide rollers 28, 29 and 30 to the splicing head assembly 6. A sixth guide roller 32 is provided for guiding tape passing from the splicing head assembly to a cassette (not shown) mounted in holder 16. It is to be noted that the location of guide rollers 22, 27, 29, 30 and 32 relative to the panel 4 are fixed. However, the guide roller 28 is rotatably mounted on a support 33 (see FIGS. 1 and 4) that is mounted on a shaft 34 that is slidable in a vertical slot 35 in panel 4. Shaft 34 has an enlarged head 37 that engages the rear side of panel 4 so as to prevent it from pulling out of the slot. A screw 39 holds support 33 on shaft 34. Roller 28 thus acts as a slack takeup, moving up when the tension in tape 14 is sufficient to overcome the force of gravity on roller 28 and dropping when the inverse is true. If necessary, support 33 may be spring-biased downwardly. In any event, the limit of movement of roller 28 are determined by the length of slot 35.

The supply reel shaft 8 and the winding spindle 20 are connected to and driven by two air turbines 36 and 38 (see FIG. 8) which are affixed to the rear of the front panel 4. Turbines 36 and 38 comprise hollow housings in which are mounted rotors (not shown) that are coupled to shaft 8 and spindle 20. The housings of turbines 36 and 38 have air inlets 42 and 44 which are connected to pressurized air supplies via hoses and valving mechanism as hereinafter described. Air supplied to turbine 36 causes shaft 8 to rotate clockwise and air supplied to turbine 38 causes spindle 20 to rotate counterclockwise. The housing of turbine 36 also has a second inlet 46 which also is connected to a pressurized air supply via a hose and appropriate valving mechanisms as hereinafter described. Air supplied to turbine 36 via inlet 46 causes shaft 8 to rotate counterclockwise.

Figure 8:
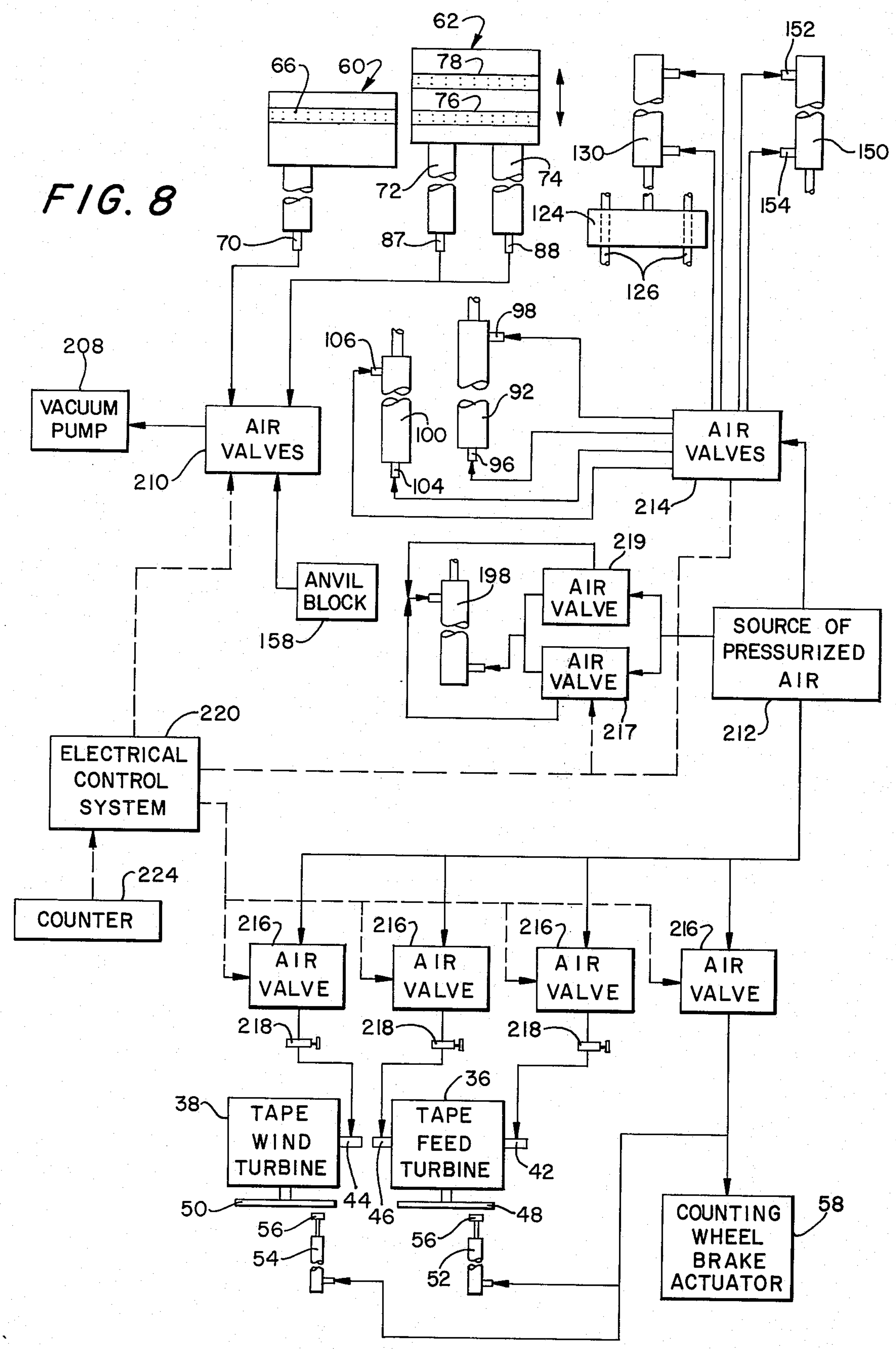
FIG. 8 is a schematic diagram of the electro-pneumatic control system of the machine of FIG. 1.

Each turbine also is provided with braking means so as to permit stopping shaft 8 and spindle 20 at selected times. various forms of braking may be used. Preferably, as shown in FIG. 8, brake discs 48 and 50 are mounted on the rotor shafts of turbines 36 and 38 respectively. Monted adjacent to these discs are small fluid actuators, i.e. air cylinders, 52 and 54 with brake pads 56 attached to the ends of their piston rods. The actuators may be double-acting, i.e. requiring one air input to extend the piston rod and another to retract the piston rod. Preferably they are single-acting, having an internal mechanical spring to retract the piston rod and requiring an air input to extend the piston rod. When the piston rods are extended, the brake pads 56 engage the brake discs and thereby cause the turbine rotors to come to a rapid stop. A similar form of braking means (shown schematically at 58 in FIG. 8) may be employed to stop the counting wheel 24 in synchonism with the turbines.

The splicing head assembly 6 comprises a stationary splicing block 60 affixed to panel 4 and a moveable splicing block 62. The two blocks have mutually confronting flat vertical end surfaces that are separated by a norrow gap 64. Block 60 has a horizontal upper surface in which is formed a groove 66 which functions as a guideway for tape. Groove 66 has a series of small apertures 68 in its base. Apertures 68 connect with an interior passageway (not shown) which is connected to a hose fitting 70 (FIG. 8) mounted on the rear side of panel 4. A hose (not shown) connects fitting 70 to a source of vacuum through a suitable valve as later described; thus a suction force can be established to hold a tape flat against the bottom of groove 66.

The moveable splicing block 62 is mounted on two parallel hollow slide rods 72 and 74 which are slidably mounted in suitable bearings in panel 4. Block 62 has a horizontal upper surface formed with two grooves 76 and 78 which are parallel to each other and groove 66. A plurality of apertures 80 and 82 are formed in the bases of grooves 76 and 78. Apertures 80 connect with an interior chamber 83 of block 62 that communicates with a side port 84 found in slide rod 72. Apertures 82 connect with another interior chamber 85 of block 62 that communicates with a side port 86 in slide rod 74. The front ends of the slide rods are plugged, while their rear ends (projecting rearwardly of panel 4) are provided with hose fitting 87 and 88 that are connected by hoses and appropriate control valves to a source of vacuum.

Figure 5:
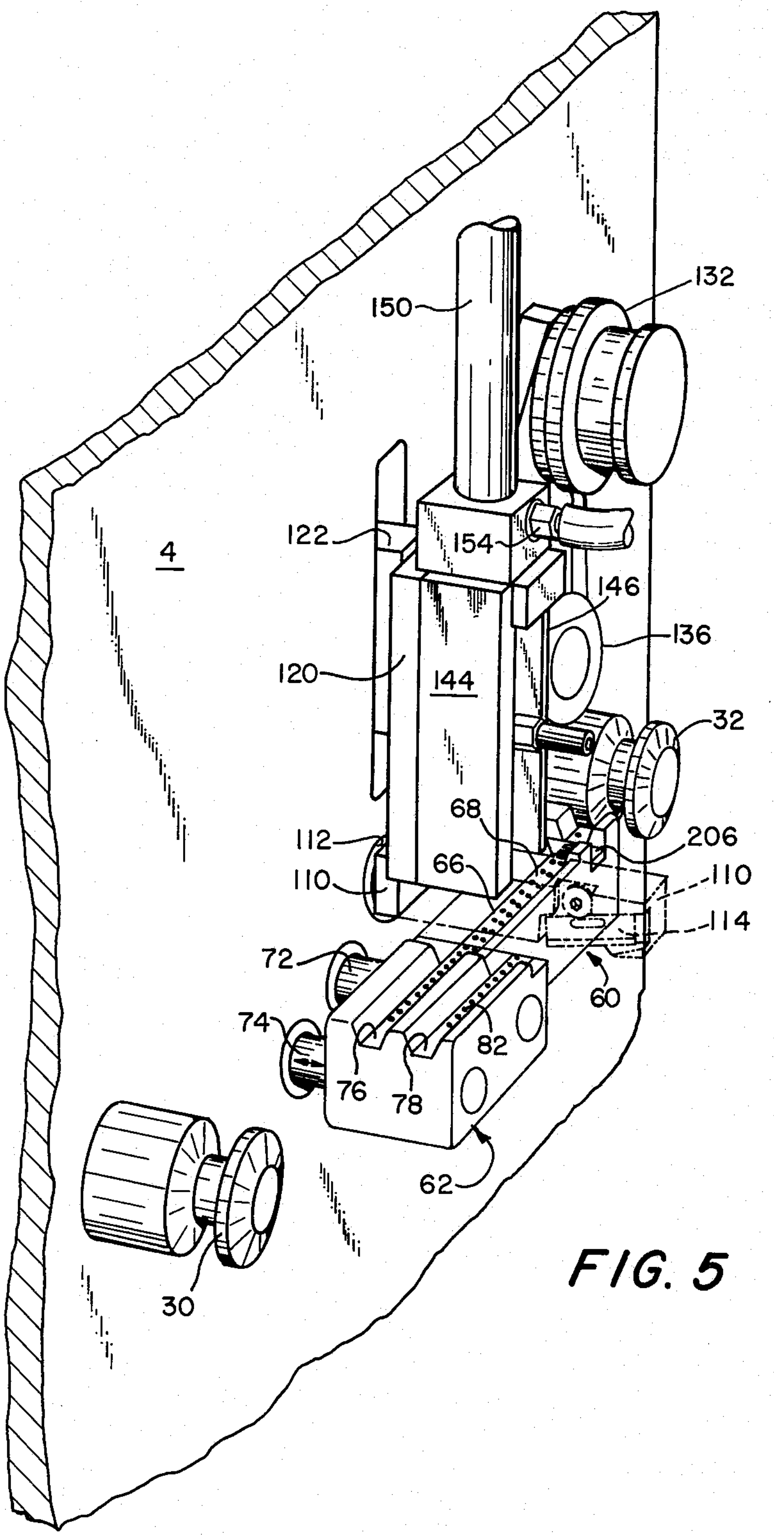
FIG. 5 is a perspective view of the cutting and splicing mechanisms of the machine shown in FIG. 1.

Grooves 76 and 78 of block 62 are coplanar with groove 66 of block 60. Hence, by moving block 62 in and out relative to panel 4, it is possible to align either of grooves 76 and 78 with groove 62. As shown in FIG. 5, block 62 has been moved away from panel 4 to a position in which grooves 76 and 66 are aligned.

Figure 6:
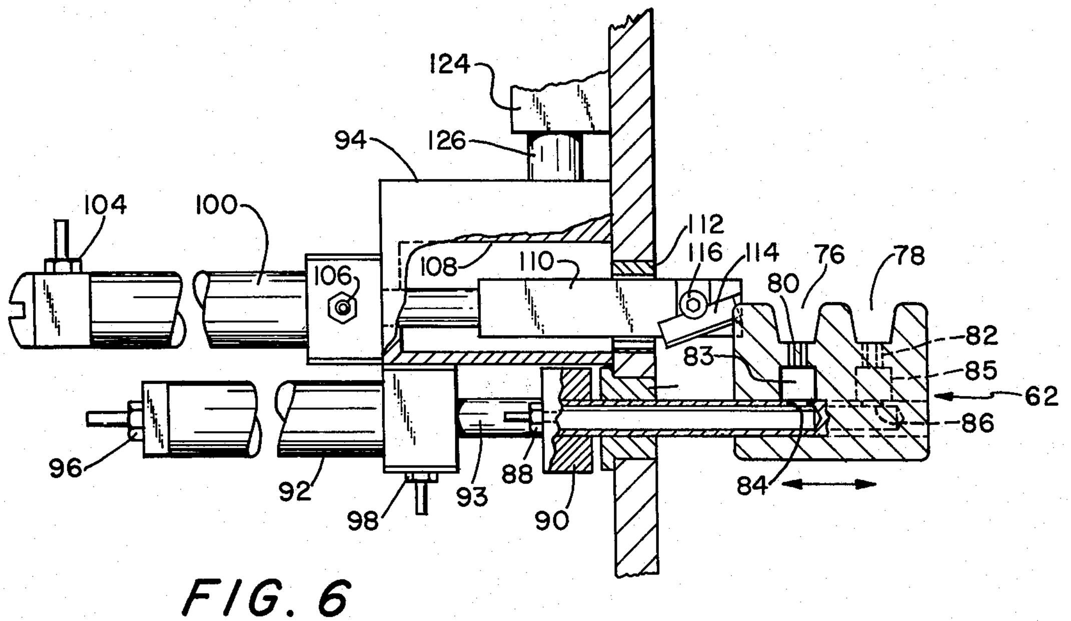
FIG. 6 is a cross-sectional view of the splicing head assembly.

Turning now to FIG. 6, the two slide rods extend through and are secured to a moveable cross-block 90 disposed behind panel 4. Also disposed behind panel 4 is a double-acting fluid actuator 92 which is affixed to the underside of a block 94 that is secured to panel 4. The piston rod 93 of actuator 92 is connected to cross-block 90 while its cylinder has fittings 96 and 98 that are connected by hoses and an appropriate control valve to a source of pressurized air. The piston rod of actuator 92 will be extended when air is applied via fitting 96 and will be retracted if air is applied via fitting 98. When the piston rod is extended, cross-block 90 engages the rear side of panel 4 to align groove 76 with groove 66. When it is retracted, splicing block 62 engages the front side of panel 4 to align groove 78 with groove 66.

Also forming part of the splicing head assembly is a knife mechanism which comprises an actuator 100 which is affixed to the block 94. Actuator 100 is a double-acting unit, having hose fittings 104 and 106 at opposite ends of its cylinder. Block 94 has an opening 108 into which extends the piston rod of actuator 100. Affixed to the end of the piston rod is a cutter blade support arm 110 which extends through and is slidably keyed to a bushing 112 mounted in an opening in panel 4. The forward end of arm 110 is slotted at one side to accommodate a cutter blade 114 that is secured in place by a screw 116. The cutter blade is mounted with its cutting edge facing down but inclined as shown in FIGS. 5 and 6. Arm 110 is located so that the edge of the cutter blade is aligned with the gap 64 and will move through the gap when the piston rod of actuator 100 is extended. When the piston rod of actuator 100 is retracted, arm 110 is withdrawn far enough so as not to interfere with movement of tape along groove 66. The slanted cutter blade edge produces a clean shearing action when it moves forward to slice through whatever tape is extending across gap 64 from groove 66 to one of the grooves 76 and 78.

The splicing tape dispenser unit 7 is adapted to apply a piece of adhesive-backed splicing tape to the abutting ends of two sections of tape supported by the two splicing blocks. Since the splicing tape dispenser may be replaced by some other unit capable of performing the same function, it is described hereinafter only to the extent necessary to facilitate understanding of the operation and advantages of the present invention. Further details of the particular splicing tape dispenser unit shown in FIGS. 1 and 5 are disclosed in my copending U.S. application Ser. No. 155,023 filed 6/21/71, now Pat. No. 3,753,835, for Splicing Tape Dispenser Applicator.

Described briefly, the unit 7 comprises a carriage plate 120 that is attached to an arm 122 which extends through a vertical slot in panel 4 and forms part of a slide block 124 located on the rear side of panel 4. Slide block 124 is slidably mounted on a pair of vertical slide rods, both of which are shown at 126 in FIG. 8, whose bottom ends are attached to block 94. The upper ends of rods 124 are attached to another block (not shown) which is affixed to the rear side of plate 4 and serves as a mount for double-acting fluid actuator 130 (FIG. 8) whose piston rod is secured to slide block 124. By applying air to one end or the other of actuator 130, slide block 124 can be made to move up or down on rods 126.

The plate 120 of the splicing tape dispenser unit 7 also carries a reel 132 containing a supply of splicing tape 134 of the type having a pressure sensitive adhesive on one side, and two feed rolls 136 and 138 which are mounted on suitable shafts that are rotatably attached to plate 120. Tape 134 passes around roll 136 and between that roll and roll 138. The unit 7 also includes means (not shown) which causes rolls 136 and 138 to rotate clockwise and counterclockwise respectively when plate 120 is moved upwardly and which prevents rotation of the same rolls when plate 120 moves downwardly. Rotation of rolls 136 and 138 causes splicing tape to be pulled off of supply reel 132 and advanced into a vertical guide channel 142 which is defined by two vertically extending spaced plates 144 and 146. Plate 146 has a horizontal slit (not shown) for admitting tape to the guide channel and the vertical stroke of plate 120 is such as to cause rolls 136 and 138 to advance the splicing tape by an amount equal to the spacing between plates 144 and 146.

Attached to and supported on the upper ends of plates 144 and 146 is another double-acting actuator 150. Actuator 150 has hose fittings 152 and 154 at the opposite ends of its operating cylinder. Attached to the end of the piston rod of actuator 150 is a plunger 156 that is mounted between and guided by the two plates 144 and 146. The plunger 156 carries a cutter blade (not shown) that slides along the inner face of plate 136 and is adapted to sever the tape 134 by a shearing action, thereby providing a short section of splicing tape in the path of plunger 156. The tape severing action occurs when the plunger 156 is driven downward in the guide channel 142 as a result of application of air via hose fitting 152. The severed section of splicing tape, being in the path of plunger 156, is driven by the plunger down onto the two splicing blocks 60 and 62 in line with the groove 66. When the carriage plate 120 moves up again as a result of application of air via hose fitting 154, splicing tape is advanced into the guide channel 142 by rolls 136 and 138 so that another section of splicing tape may be cut and applied on the next downward stroke to the carriage plate.

Figures 2, 3, 4:
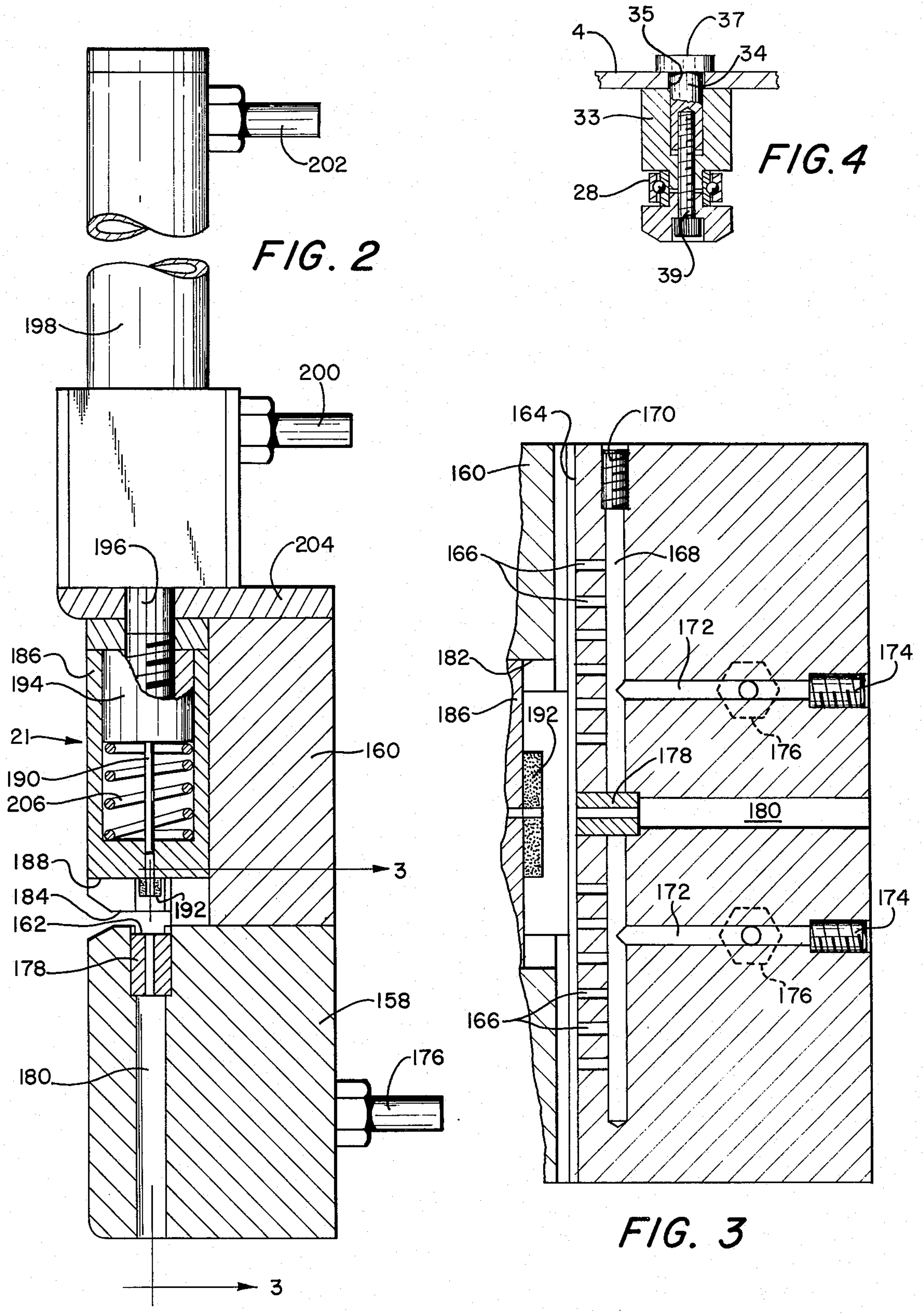
FIG. 2 is a sectional view taken along line 2—2 of FIG. 1.
FIG. 3 is a sectional view taken along line 3—3 of FIG. 2.
FIG. 4 is a sectional view taken along line 4—4 of FIG. 1.

Referring now to FIGS. 1–3, the tape punching mechanism 21 comprises an anvil block 158 and a punch support block 160, both of which are anchored to panel 4. Anvil block 158 has a groove 162 formed in that side thereof that faces block 160. Groove 162 has straight parallel sides and a flat base 164. The latter has a row of small spaced holes 166 that communicate with an elongate chamber 168 formed integrally of anvil blocks 158. Chamber 168 is formed by drilling a hole in block 158 and then blocking it off by a plug 170. Block 158 also has two passages 172 that intersect and communicate with chamber 168. Passages 172 are formed by drilling parallel holes in block 158 and then blocking them off by means of plugs 174. The rear side of anvil block 158 has a pair of openings that connect with passages 172 and are fitted with hose fittings 176 that extend through holes in panel 4 and are connected by hoses (not shown) to a source of vacuum as explained below. Block 158 also has a sleeve 178 mounted in an enlarged hole in the base of groove 162. Sleeve 178 is mounted flush with the base 164 of groove 162 and serves as a punch die. Block 158 has a bore 180 that is aligned with sleeve 178. Bore 180 serves as a discharge passage for material punched out of the tape 14 as hereinafter described.

The punch support block 160 is formed with a wide slot 182 that extends at a right angle to the groove 162 of block 158. Block 160 also is undercut at slot 182 as shown at 184 so as to provide a channel that facilitates threading tape and also visual inspection of movement of the punching tool. Mounted in and guided by slot 182 is a hollow plunger 186. Pluger 186 has a flat end face 188 that is provided with a hole that slidably accommodates a punch 190 which is aligned with the punch die 178. Attached to end face 188 is a resilient pad 192 preferably made of a natural or synthetic rubber. Pad 192 has a hole through which the punch 190 is slidable and has a width that is small enough to fit in groove 162 and wide enough to cover a section of the tape 14 that is to be punched. The punch 190 is an elongate round pin with a flat end surface that has a sharp right-angled edge and is sized so as to make a snug sliding fit in sleeve 178, with a shearing tape cutting action occuring as it enters the sleeve.

Mounted within plunger 186 is a piston 194 that is attached to the end of the actuating rod 196 of a double-acting pneumatic actuator 198 having hose fittings 200 and 202. The cylinder of actuator 198 is attached to a plate 204 that is anchored to block 160. Rod 196 extends slidably through matching holes in plate 204 and the adjacent end wall of plunger 186. A compression spring 206 surrounds punch 190 and bears against the end of piston 194 and the opposite end of plunger 186.

Operation of the punching mechansim will now be described. Vaccum may be applied via fitting 176 at all times while the winding machine is in operation, but preferably only when a punching operation is to be performed. The applied vacuum acts via holes 166 to create a suction that holds the section of tape to be punched against the base 164 of groove 162. During the time that tape is being transported through the punching unit 21, air is being applied to the actuator 198 via fitting 200, with the result that the actuating rod 196 is retracted and piston 194 is in the position shown in FIG. 2. At this time spring 206 urges the plunger 186 away from the plate 204 so that the punch 190 is retracted short of the end face 188 of plunger 186. Punching of tape is accomplished by relieving the air pressure at fitting 200 and applying air via fitting 202. The air applied via fitting 202 causes the actuator rod to move toward block 158. Due to the compression force exerted by spring 206, the initial movement of rod 196 causes the plunger to move down far enough for the pad 192 to engage the section of tape 14 located in groove 162 and to press it tight against the base 164 of that groove. When this occurs, the plunger cannot move further in the same direction, with the result that continued movement of actuating rod 196 causes spring 206 to compress and the punch 190 to be driven through the pad 192 and the pressed section of tape into the sleeve 178. This action of the punch produces a hole in the tape and the punched out piece of tape is driven by the punch into the bore 180. Air pressure is relieved at fitting 202 and reapplied at fitting 200 as the plunger penetrates sleeve 178, with the result that the actuating rod 196 is again retracted. Spring 206 delays retraction of plunger 186 and allows punch 190 to be retracted from sleeve 178 while pad 192 is still pressing against the tape 14. Plunger 186 retracts as the piston reaches the limit of its retraction movement in the plunger.

FIG. 8 illustrates the control system for the above described machine embodying the present invention. In FIG. 8 the full lines represent air lines and the broken lines represent electrical connections. Suction for holding tapes on the splicing blocks 60 and 62 and to the anvil block of the punching mechanism is achieved by means of a suction pump 208 which is connected to hose fittings 70, 87, 88 and 176 via four air valves represented schematically at 210. Air for operating actuators 92, 100, 130 and 150 is applied from a pressure source 212 via a plurality of air valves 214. An additional plurality of air valves 216 connect the source of pressurized air to the inlets 42 and 46 of turbine 36, inlet 44 of turbine 38 and the turbine and counting wheel brake actuators 52, 54 and 58. Air also is supplied to actuator 198 via one or the other of air valves 217 and 219. Valves 210, 214, 216, and 217 are solenoid operated on-off valves. Valve 219 is a manually operable air valve having an actuating button 221 located in the front panel 4 of the machine. Manually controllable needle valves 218 permit the air inputs to turbines 36 and 38 to be independently controlled. Operation of air valves 210, 214, 216 and 217 so as to achieve the sequential operation described below is effected by an electromechanical control system represented schematically at 220 which is adapted to operate in response to the signal output of a counter 225 that is adapted via means (not shown) to count revolutions or fractions of a revolution of counting wheel 24 and a start button 223 (FIG. 1). By way of example but not limitation, the input for the counter 225 may be derived by photoelectric means of the type described in my copending application Ser. No. 154,857 filed 6/21/71, for Air Turbine Drive System for Tape Winding and Splicing Machine. The counter is of the type that can be set to produce an output signal pulse when a predetermined count is reached and to automatically reset itself when its output signal pulse occurs.

Figure 7:
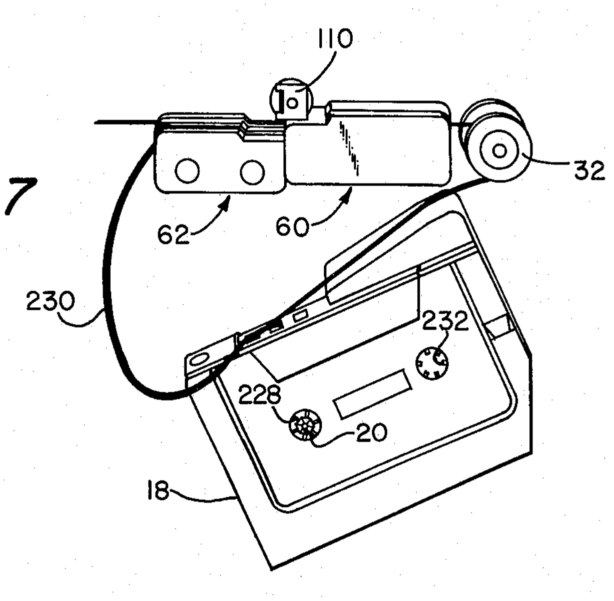
FIG. 7 is a perspective view showing how the leader of a pre-leadered cassette is disposed on the splicing head assembly.

Referring now to FIGS. 1 and 8, the manner in which the tape punching mechanism is operated in the machine described above will now be described. Initially magnetic tape 14 is unwound from reel 10 and passed over the counting wheel 24 and through the punching mechanism 21 as shown in FIG. 1 far enough to be positioned on the guideway 76 of moveable splicing block 62, with the leading end of the tape located just short of the gap 64 between blocks 60 and 62. At this time vacuum is being applied through both slide rods 72 and 74 so that the tape will be held in groove 76 by suction. Suction is also applied through fitting 70 to splicing block 60 and through fittings 176 to the anvil block 158 of the punching mechanism. Then a pre-leadered cassette 18 (see FIG. 7) is mounted in holder 16 so that its left-hand hub 228 is locked to the spindle 20. It is to be noted that a pre-leadered cassette is one having a length of leader tape 230 attached to its two hubs. Sufficient leader tape is provided in the cassette 18 to permit the leader tape to be pulled out far enough to be placed over the two splicing blocks. As seen in FIG. 7, the leader tape 230 is pulled out to form a large loop which is reversed so that the leader extends from hub 228 upwardly around the guide roll 32, then along the grooves 66 and 78 of splicing blocks 60 and 62, and then back to the second hub 232 of the cassette. The leader tape is held in place in grooves 66 and 78 by suction. Initially splicing block 62 is retracted so that groove 78 is aligned with the groove 66, whereby the loop of leader 230 can be disposed in these two grooves 78 and 66 as above described.

Then air valve 219 is operated by pressing its operating button 221. This cause actuator 198 to extend its operating rod 196 whereby a hole is punched in the section of tape 14 disposed in groove 162. When button 221 is released the valve 219 is caused to restore operating rod 196 to its original retracted position. The start button is pressed to activate the electrical control system which causes the machine to operate as described below. First the cutter mechanism is actuated to cause the cutter arm 110 to reciprocate over the two splicing blocks whereby its cutting blade 114 severs the leader tape 230 into two discrete leaders, one supported on splicing block 60 and connected to hub 228, and the other supported on splicing block 62 and connected to hub 232. As soon as the cutter arm 110 has returned to its original retracted position, the actuator 92 is caused to shift the splicing block 62 away from the panel 4 to the position shown in FIGS. 5 and 6 so that the magnetic tape 14 resting in groove 76 is now aligned with the leader supported by splicing block 60. Thereafter the tape dispensing unit 7 is operated. It is to be noted that the unit 7 is normally in the elevated position shown in FIGS. 1 and 5. When it is operated, its carriage plate 120 moves downward far enough for the bottom ends of the plates 144 and 146 to be close to or lightly contact the tapes resting in grooves 66 and 76. At that point the actuator 150 is caused to move the plunger 156 downward. Assuming that splicing tape has previously been fed into the channel 142 between plates 144 and 146, downward movement of plunger 156 will cause its cutter to sever the splicing tape, and the severed section of splicing tape is then driven downward by plunger 156 onto the adjacent ends of the leader supported by splicing block 60 and the tape supported in groove 76 of splicing block 62. Plunger 156 is immediately retracted, and as this occurs, the carriage plate 120 is also retracted to its original raised position. Once the tape 14 has been spliced to the leader supported by splicing block 60, the turbines 36 and 38 are actuated to drive shaft 8 and winding spindle 20 in a direction to wind tape onto the hub 228 of the cassette. At this point, it is to be noted that during the time that the driving spindle 20 is being rotated, vaccum is being constantly applied to the apertures of the groove 78 so as to hold in place the leader that is attached to the hub 188. Vacuum may continue to be applied to the grooves 66, 76, and 162 via air valves 210 as the tape is being wound since any suction effect will not prevent the tape from being pulled by rotation of spindle 20. Preverably, however, vacuum is turned off with respect to those three grooves during the winding operation. Once a predetermined amount (as determined by counter 224) of tape has been wound on hub 228, shaft 8 and spindle 20 are stopped and vacuum is reapplied so as to hold the tape 14 by suction in the grooves 66, 76 and 162. Then punching unit 21 is again operated to punch another hole in tape 14. Next the winding spindle is jogged to wind another shorter length of tape on hub 228. Then the punching unit is again operated to punch another hole in the tape. The extent of which the winding spindle is jogged depends on the desired location of the punched hole from the leader connected end of the tape. Thus if the hole is to be punched 18 inches from the leader, the spindle is jogged far enough to move tape 14 a distance of 36 inches.

Thereafter the cutter mechanism is again actuated so as to cause cutter blade 114 to sever the tape 14 along the line of separation between the two splicing blocks. Then the actuator 92 is caused to return the splicing block 62 to its original position in which its groove 78 is aligned with the groove 66. Once this has occurred, the splicing tape dispensing unit 7 is again actuated so as to apply a section of splicing tape to the trailing end of the tape 14 resting in the groove 66 and the end of the leader 230 located in the groove 78. The machine then stops. The leader 230 and the tape 14 attached thereto are then lifted off the two splicing blocks and the guide roll 32 and the cassette removed from the holder 16. One of the hubs 228 and 232 is then rotated so as to draw all of the tape into the cassette. A new cassette is then installed in the holder 16 with its leader pulled out and placed into the grooves 66 and 78 of the two splicing blocks, and then the cutting, splicing and winding operations above described are repeated by pressing start button 223.

It is to be noted that the location of the punching mechanism is determined according to the desired location of the hole punched in the tape. If the hole is to be located 18 or 20 inches from the point where the tape is connected to the leader, the punching mechanism is disposed so that the length of tape travel from the punch 190 to the tape cutter blade 116 (i.e. gap 64) is equal to 18 or 20 inches respectively. The jogging operation is stopped when the tape has moved twice the distance from punch 190 to gap 64.

It is contemplated that the invention may be practiced other than as herein described. Thus, for example, the method of this invention may be carried out with other apparatus, e.g. the punching mechanism may be installed in a tape winding machine of the type described in my U.S. Pat. No. 3,637,153.

In any event, the invention makes it possible to load cassettes with registration holes punched in a predetermined location relative to the attached ends of the tape. Of course, the invention also may be used to provide only one hole in a tape, as may be desired where the tape is to be used for single rather than double or plural (e.g. 8) track recording. Thus the method above-described may be modified so as to provide a registration hole only at the trailing end of the tape. Essentially the modified method consists of attaching one end of a tape wound on a supply reel to one hub of a cassette, winding a given amount of the tape on that hub, punching a hole in the tape at a point between the supply reel and the hub, winding an additional amount of tape on the one hub sufficient to advance the punched hole beyond the knife means used to sever the tape, severing the tape and attaching the free end of the tape wound on the one hub to the second hub of the cassette.

The invention also is applicable to loading cassettes with photographic film rather than magnetic tape, and hence the term "tape" is to be construed as including a web of magnetic, photographic or other type of recording media.

What is claimed is:

1. Method of tailoring and splicing a magnetic tape comprising (1) withdrawing tape from a supply reel and threading it through a hole punching station to a splicing station; (2) punching a hole in said tape at said punching station; (3) splicing the tape at said splicing station to a first leader tape; (4) winding said first leader tape on a hub and continuing said winding so that a relatively long length of magnetic tape is transported from said supply reel through said punching and splicing stations and wound on said hub; (5) terminating said winding; (6) punching a second hole in said magnetic tape at said punching station; (7) resuming winding of magnetic tape on said hub and terminating winding after said second hole has passed through said splicing station; (8) punching a third hole in said magnetic tape at said punching station, and severing said magnetic tape at said splicing station between said second and third holes so as to form a trailing end for the tape wound on said first hub and a new leading end for the tape on said supply reel; (9) splicing said trailing end to a second leader tape; (10) splicing said leading end to a third leader tape; and (11) repeating steps 4–9.

2. Apparatus for tailoring magnetic tape comprising:

a first station having punching means for punching a hole in a tape;

a second station having a splicing block adapted to support a tape;

knife means operative to sever a tape supported on said splicing block;

splicing tape applicator means for applying an adhesive splicing tape to the adjacent ends of two different tapes supported on said splicing block;

means including a winding spindle adapted to support a tape cassette hub, and drive means for rotating said winding spindle for transporting a tape through said first and second stations and winding it on the hub supported by said spindle; and control means for operating the aforementioned means in the following sequence: actuating said punching means, operating said knife means, actuating said splicing tape applicator means, operating said drive means, terminating operation of said drive means, actuating said punching means, operating said drive means for a time sufficient for said winding spindle to wind a length of tape in excess of the length of the path followed by a tape passing from said tape punching means to said splicing block, terminating operation of said drive means, actuating said punching means, operating said knife means, and operating said splicing tape applicator means.

3. In a method of loading tape into a cassette comprising the steps of attaching the end of a supply of tape in roll form to one hub of the cassette, winding a selected amount of said tape onto said one hub, severing said tape at a point between said supply of tape and said cassette to form a trailing end for the tape wound on said one hub, and attaching said trailing end to another hub of said cassette, the improvement comprising interrupting winding of said tape after a substantial portion of said selected amount has been wound on said one hub, punching a hole in said tape at a point between said supply of tape and said cassette and resuming winding of said selected amount of tape onto said hub.

4. Apparatus for tailoring magnetic tape comprising:

a first station having punching means for punching a hole in a tape;

a second station having a splicing block adapted to support a tape, said splicing block comprising first, second and third tape support means, said first tape support means being stationary and said second and third tape support means being moveable alternately into aligned relation with said first tape support means;

splicing block actuating means for moving said second and third tape support means alternately into aligned relation with said first tape support means;

knife means operative to sever a tape supported on said splicing block;

splicing tape applicator means for applying an adhesive splicing tape to the adjacent ends of two different tapes supported on said splicing block;

means including a winding spindle adapted to support a tape cassette hub, and drive means for rotating said winding spindle for transporting a tape through said first and second stations and winding it on the hub supported by said spindle; and control means for operating the aforementioned means in the following sequence: actuating said punching means, operating said knife means, aligning said first and second tape support means, actuating said splicing tape applicator means, operating said drive means, terminating operation of said drive means, actuating said punching means, operating said drive means for a time sufficient for said winding spindle to wind a length of tape in excess of the length of the path followed by a tape passing from said tape punching means to said splicing block, terminating operation of said drive means, actuating said punching means, operating said knife means, aligning said first and third support means, and operating said splicing tape applicator means.

* * * * *